3,274,007
HIGH-TEMPERATURE RESISTANT SELF-HEALING
COATING AND METHOD OF APPLICATION
Francis L. Jones, Atlanta, Ga., assignor to Lockheed
Aircraft Corporation, Burbank, Calif.
No Drawing. Filed Aug. 1, 1963, Ser. No. 299,175
7 Claims. (Cl. 106—55)

This invention relates to a high-temperature resistant coating, and more particularly to a high-temperature resistant coating having self-healing properties.

In recent years, a considerable amount of research has been conducted toward the development of high-temperature resistant protective coatings for industrial applications such as the coating of the interior walls of furnaces and the coating of metals such as the refractory metals which have a high melting point but deteriorate upon exposure to oxygen at elevated temperatures below their melting point. For best results to be achieved, from the standpoint of economics, it is desirable to provide a coating which may be applied simply by spraying. Prior to this invention, efforts toward the development of a simple spray coating made up of several materials which would withstand elevated temperatures above 3,000° F. over a relatively long period of time have been unsuccessful.

To eliminate the deficiencies and limitations of such prior art coatings, there is provided in accordance with this invention a combination coating comprising a refractory oxide having silicon intermixed and dispersed therein. The refractory oxides have an extremely high melting point; however, they have imperfections in the form of pits and fissures. To render the refractory oxides useful for coating, it is necessary to seal the imperfections therein to prevent oxygen from penetrating the coating. Toward this end, the silicon is mixed with the refractory oxide and is arc plasma sprayed on a substrate such that the silicon fills the voids in the refractory oxide.

Accordingly, it is an object of this invention to provide a simple self-healing arc plasma spray coating for refractory metals which will withstand high temperatures in excess of 3,000° F. over relatively long periods of time.

Another object of this invention is to provide a simple arc plasma spray coating which is resistant to elevated temperatures in excess of 3,000° F. over extended periods of time which is impact resistant.

A further object of this invention is to provide a simple arc plasma spray coating which has self-healing properties and is resistant to temperatures over relatively long periods of time up to in the order of 3,300° F.

Still a further object of this invention is to provide a self-healing coating compound comprising a dry-mixed refractory oxide and silicon for arc plasma spraying on a refractory metal.

A still further object of this invention is to provide a process of coating an object with a self-healing heat-resistant coating by arc plasma spraying.

Generally stated, this invention relates to a self-healing arc pasma sprayed coating consisting of a refractory oxide having silicon mixed therewith. While refractory oxides are relatively stable up to their melting points (well in excess of 3,000° F.) they have a tendency to be somewhat porous in that cracks, fissures and pits (hereinafter called voids) are contained therein. In contrast, silicon has a considerably lower melting point, is quite dense, and becomes viscous at a temperature in the order of 2,500° F.

This invention alleviates the disadvantages of these materials for high temperature coating applications by combining them so that the silicon fills the voids in the refractory oxide. More particularly, in accordance with the invention, a refractory metal is grit-blasted to a surface roughness in the order of 20 micro-inches to provide anchor points with which the coating applied thereto can adhere. In the preparation of the coating, the refractory oxide and silicon in powder form are dry-blended in proportion by weight and deposited on the refractory metal to a thickness preferably in the order of 5 mils by a conventional arc plasma spray gun from a distance of four to six inches. All coatings prepared and tested were applied to the refractory metal alloy molybdenum—0.5 titanium; however, it is to be expressly understood that the coatings are as easily applied to other metals or materials having the requisite surface roughness necessary to obtain good adherence.

Self-healing coatings were constructed in accordance with this invention by dry-mixing each of the refractory oxides—magnesia, zirconia, and alumina—in proportions by weight of 75 percent to 50 percent of the refractory oxide with 25 percent to 50 percent of the silicon. These coatings were tested by impinging a blast flame directly upon the coating surface at various temperatures. The tests disclosed that all the 75 percent refractory oxide and 25 percent silicon coatings could withstand a temperature of at least 3,500° F. for at least 15 minutes, with the coating containing magnesia being considerably better than the other coatings in that it could withstand this temperature for a materially longer time, and an average temperature of 3,200° F. for in the order of 3 hours.

The tests of the 50 percent refractory oxide and 50 percent silicon coatings disclosed that when the proportion of silicon is increased the coatings containing the refractory oxides, zerconia and alumina, could withstand a temperature in excess of 3,100° F. for about 30 minutes, and the coating containing magnesia could not. These tests indicate that when it is desired to materially increase the silicon content and still obtain protection at relatively high temperatures for relatively long periods of time, the refractory oxides, zirconia and alumina, should be employed in the coating rather than magnesia. A study of these coatings during and after exposure to the blast flame indicated that the superiority of the coatings containing zirconia and alumina, when combined with a higher percentage of silicon, is attributable to their greater porosity than the magnesia by providing more voids for entrapment of the silicon than the coating containing the less porous magnesia in which the silicon flowed too freely.

Additional tests conducted on the magnesia and silicon coating disclosed that coatings having good temperature resistance may be obtained when the proportion by weight of magnesia is within the range of 60 percent to 80 percent by weight and the silicon is within the complementary range of 40 percent to 20 percent by weight. The tests also disclosed that for high temperatures in the order of 2,500° to 3,500° F., a coating containing in the order of 25 percent silicon by weight, the silicon being relatively viscous at the higher end of this temperature range, would provide a coating having optimum continuity; while at lower temperatures in the order of 2,500° to 3,000° F. a coating containing in the order of 35 percent silicon by weight, the silicon being relatively non-viscous at the lower end of this temperature range, would provide a coating of optimum continuity.

In summary, since all the refractory oxides have similar properties, they will all provide coatings having good temperature resistance within the optimum range found for the refractory oxide magnesia and silicon coating. It should be noted, however, that the refractory oxide, zirconia, has relatively poor shock resistance and that accordingly coatings containing zirconia can only be expected to withstand one rapid elevation to a high temperature and should not be exposed to extreme thermal shock environment if best results are to be obtained. On the other hand, the coatings containing magnesia and alumina have extremely good thermal shock resistance and may be repeatedly exposed to thermal shock without failure of the coating.

It may be seen therefore that a coating constructed according to this invention provides excellent protection against high temperatures, is easily and economically applied, and accordingly has many applications in our present-day technology.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A self-healing heat-resistant coating composition for arc plasma spraying consisting essentially of:
   a refractory oxide dry-mixed with silicon wherein the proportion of silicon is between in the order of 20 percent to 40 percent by weight of the composition.

2. A self-healing heat-resistant coating composition for arc plasma spraying consisting essentially of:
   a refractory oxide dry-mixed with silicon wherein the proportion of silicon is in the order of 25 percent to 35 percent by weight of the composition.

3. A self-healing heat-resistant coating composition for arc plasma spraying consisting essentially of:
   the refractory oxide magnesia dry-mixed with silicon wherein the proportion of silicon is in the order of 25 percent by weight of the composition.

4. A self-healing heat-resistant coating composition for arc plasma spraying consisting essentially of:
   the refractory oxide magnesia dry-mixed with silicon wherein the proportion of silicon is in the order of 35 percent by weight of the composition.

5. A self-healing heat-resistant coating composition for arc plasma spraying consisting essentially of:
   the refractory oxide magnesia dry-mixed with silicon wherein the proportion of silicon is in the order of 25 percent to 35 percent by weight of the composition.

6. A self-healing heat-resistant coating composition for arc plasma spraying consisting essentially of:
   a refractory oxide selected from the group consisting of zirconia and alumina dry-mixed with silicon wherein the proportion of silicon is in the order of 50 percent by weight of the mix.

7. A process of coating an object with a self-healing heat-resistant coating comprising the steps of:
   preparing the object substrate to a surface roughness in the order of 20 micro-inches;
   a dry-mixing a refractory oxide and composition in proportion such that the proportion of the silicon is in the order of 20 percent to 40 percent of the composition by weight;
   and arc plasma spraying said mixture onto said object substrate to a thickness in the order of 5 mils.

References Cited by the Examiner

UNITED STATES PATENTS

| | | | |
|---|---|---|---|
| 2,741,822 | 4/1956 | Udy | 106—65 |
| 2,904,449 | 9/1959 | Bradstreet | 117—105.2 |
| 3,077,659 | 2/1963 | Holzwarth et al. | 117—105.2 |

TOBIAS E. LEVOW, *Primary Examiner.*

J. E. POER, *Assistant Examiner.*